United States Patent [19]

Finney

[11] 4,349,089
[45] Sep. 14, 1982

[54] AUTOMATIC TRANSMISSION SHIFT LOCKING DEVICE

[75] Inventor: Cecil H. Finney, Pensacola, Fla.

[73] Assignee: Armstrong Cork Company, Lancaster, Pa.

[21] Appl. No.: 112,373

[22] Filed: Jan. 15, 1980

[51] Int. Cl.³ .............................................. B60K 41/26
[52] U.S. Cl. .................... 192/4 A; 192/4 C
[58] Field of Search ................................. 192/4 A, 4 C

[56] References Cited

U.S. PATENT DOCUMENTS

| 3,250,142 | 5/1966 | Schuster et al. | |
| 3,523,588 | 8/1970 | Bradshaw | |
| 3,550,734 | 12/1970 | Sinoda | 192/4 C |
| 3,602,061 | 8/1971 | Nemiroff | |
| 3,635,317 | 1/1972 | Crabb et al. | |
| 3,682,014 | 8/1972 | Magg et al. | |
| 3,692,156 | 9/1972 | Week | 192/4 A |
| 3,913,700 | 10/1975 | James | |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,246,989 | 1/1981 | Kohler | 192/4 A |

Primary Examiner—George H. Krizmanich

[57] ABSTRACT

A brake controlled, hydraulic pressure operated locking means is provided for preventing the operation of a vehicle's automatic transmission control lever when a vehicle is in motion.

7 Claims, 1 Drawing Figure

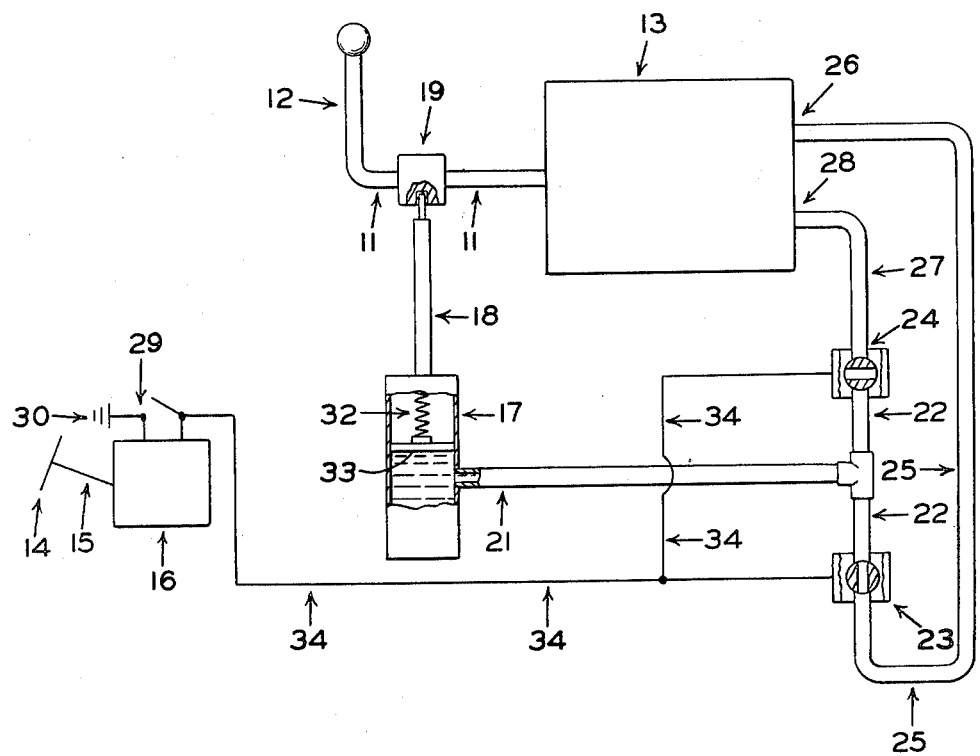

AUTOMATIC TRANSMISSION SHIFT LOCKING DEVICE

BACKGROUND OF THE INVENTION

The present invention is primarily directed, but not limited to, heavy-duty vehicles such as lift trucks or the like. One of the inherent problems with equipment of this type is that it is possible for the operator to place the vehicle's automatic transmission in a gear opposite the direction of travel of the vehicle while the vehicle is in motion. In effect, the operator, by not making the effort required to apply the vehicle's brake to bring the vehicle to a halt prior to changing direction, is using the transmission itself to brake the vehicle. This invariably results in excessively rapid wear of the vehicle's transmission, thus greatly adding to maintenance expenses. It is desirable, therefore, to force the driver of such a vehicle to use the regular brake system to brake the vehicle prior to changing its direction.

Accordingly, it is an object of this invention to provide a means for preventing shifting of an automatic transmission while the vehicle is in motion.

It is a further object of this invention to provide a locking means for preventing the shifting of an automatic transmission between forward and reverse gears while the vehicle is in motion.

It is yet another object of the present invention to provide a mechanism of the type herein before outlined wherein the locking means can only be disengaged through the use of the vehicle's regular wheel brake system.

SUMMARY OF THE INVENTION

These objects are obtained, in accordance with the present invention, by an apparatus which prevents the shifting of a vehicle's automatic transmission from forward to reverse or vice versa without first completely stopping the vehicle. In this invention, a hydraulically operated locking means engages a vehicle's automatic transmission's gear shifting means in the form of the shifting rod when the vehicle is in motion, thus preventing the operator from shifting the vehicle from the gear in which it is operating. The locking means is activated by fluid pressure provided by the vehicle's automatic transmission. When the vehicle's brake is activated, an electrically activated valve means is opened which allows the transmission fluid to return to the transmission, thus disengaging the locking means from the gear shifting means and permitting the transmission to be shifted into the desired gear.

DESCRIPTION OF THE FIGURE

The FIGURE is a partially diagrammatical, partially breakaway view of the automatic transmission shift locking device of the invention as incorporated in a vehicle's automatic transmission and braking systems.

The vehicle's automatic transmission assembly includes a gear shift rod 11 which is rotated about its axis by a manually graspable gear shift lever 12 fixed to one end thereof. The other end of the gear shift rod 11 is engaged to the vehicle's automatic transmission housing 13. The gear shift lever 12 is utilized by the vehicle's operator to rotate the gear shift rod 11 about its axis by which means the operator can select the transmission gear in which the vehicle is to operate.

The vehicle's brake means includes a brake pedal 14 which is attached, via a connecting rod 15, to a master cylinder 16.

The locking means of the apparatus of the present invention comprises, for example, a spring loaded hydraulic cylinder 17 containing a plunger means, in the form of a plunger 18. The locking-means is positioned adjacent to the gear shift rod 11 so that when the hydraulic cylinder 17 is pressurized its plunger 18 will engage the gear shift rod 11 at contact area 19 and thus prevent the movement of gear shift rod 11. The hydraulic cylinder 17 is actuated by fluid pressure provided by the vehicle's automatic transmission fluid. The automatic transmission fluid is fed into hydraulic cylinder 17 via transmission fluid passageway 21. In the FIGURE, the pressure of the automatic transmission fluid on piston 33 keeps spring 32 in a compressed state so that plunger 18 is extended to thereby engage gear shift rod 11. The other end of transmission fluid passageway 21 intercepts conduit 22 which connects a first electrically actuated valve means 23 and the second electrically actuated valve means 24. The first electrically actuated valve means 23, which is represented in its "open" position, is connected, via fluid feed line 25, to the automatic transmission high pressure port 26, which contains transmission fluid under pressure. The second electrically actuated valve means 24, which is represented in its "closed" position, is connected, via fluid return line 27, to the automatic transmission return port 28, which is not under pressure. The two electrically actuated valve means 23 and 24 are wired, via electrical circuit means 34, to oil pressure switch 29 which in turn is wired to power source 30, such as a battery. The oil pressure switch 29 is mounted at the end of the master cylinder 16 and is normally spring biased in the open position, as illustrated in the FIGURE. When brake pedal 14 is depressed, oil pressure switch 29 is closed.

DESCRIPTION OF THE INVENTION

The apparatus constructed according to the present invention is particularly adapted for use with a heavy-duty motor vehicle, such as a lift truck. The motor vehicle includes an automatic transmission assembly which includes a gear shifting means in the form of the gear shift rod 11 which is rotated about its axis by a manually graspable gear shift lever 12 fixed to one end thereof. The other end of the gear shift rod 11 is engaged to the vehicle's transmission 13. The gear shift lever 12 is utilized by the vehicle's operator to rotate the gear shift rod 11 about its axis by which means the operator can select the transmission gear which the vehicle is to operate in a well-known manner. As is well known of automatic transmissions, the transmission gear shift lever is movable between forward drive, neutral and reverse positions.

The motor vehicle also includes a brake means which includes a brake pedal 19 which is attached, via a connecting rod 15, to a master cylinder 16. In operation, when pressure is applied to the brake pedal 14, the connecting rod 15 forces a piston to move in the master cylinder 16. The movement of the piston forces brake fluid from the master cylinder 16 into the brake lines. The motor vehicle can, in the case of lift trucks, optionally also include an inching brake pedal which, when pressure is applied thereto, causes the transmission fluid pressure to drop. This variance in pressre enables the operator, on using the inching pedal, to move the vehicle extremely short distances either backward or forward.

The locking means of the apparatus of the present invention comprises a spring loaded hydraulic cylinder 17 containing a plunger means, in the form of a plunger 18 or rod. The locking means is positioned adjacent to gear shift rod 11 so that when the hydraulic cylinder 17 is pressurized its plunger 18 will engage the gear shift rod 11, and thus prevent the movement of the gear shift rod 11. The hydraulic cylinder 17 is actuated by fluid pressure provided by the vehicle's automatic transmission fluid. The automatic transmission fluid is fed into the hydraulic cylinder 17 via a transmission fluid passageway 21. Thus, one end of the transmission fluid passageway 21 is conneced to the hydraulic cylinder 17. The other end of the transmission fluid passageway intercepts a conduit 22 which connects a first electrically actuated valve means, that is, a solenoid valve (hereinafter referred to as the first solenoid valve 23) and the second electrically activated valve means (hereinafter referred to as the second solenoid valve 24). The first solenoid actuated valve 23 is connected, via a fluid feed line 25, to that portion of the automatic transmission, hereinafter designated as the automatic transmission high pressure port 26, which contains transmission fluid under pressure. The second solenoid actuated valve 24 is connected, via a fluid return line 27, to a reservoir portion of the automatic transmission, hereinafter designated as the transmission return port 28, which is not under pressure. The two solenoid valves mentioned above are never both simultaneously in the same open or closed position. Thus, when one valve is opened, the other is always closed. The two solenoids are wired to an oil pressure switch 29 which in turn is wired to a power source 30, such as a battery. The oil pressure switch 29 is mounted at the end of the vehicle's master cylinder 16 and is normally spring biased in the open position. The switch 29 is not closed until the brake pedal 14 is depressed and pressure builds up in the master brake cylinder 16 and brake lines. When the brake pedal 14 is depressed, the switch 29 is closed, the electrical circuit to the solenoids is complete, and the solenoids are thus actuated. When the solenoids are actuated, the respective valves are moved to a position opposite the position they maintain when the solenoids are not actuated. Specifically, when the solenoids are not actuated, the first solenoid actuated valve 23 is maintained in an open position and the second solenoid actuated valve 24 is maintained in a closed position. When the solenoids are actuated, the first solenoid actuated valve 24 is closed and the second solenoid actuated valve 23 is open.

Optionally, a timer switch mechanism can be inserted in the circuit described above between the oil pressure switch 29 and the solenoids. Thus, when the oil pressure switch 29 is closed, the battery is connected to the timer switch mechanism, which starts the timer running. At the end of the timer cycle, the timer switch is closed and the solenoids are activated. In another optional embodiment which is specifically adaptable to lift trucks, a micro switch is mounted on the linkage of the inching brake pedal so that the micro switch is closed when the inching brake pedal is depressed. When the micro switch is closed, a current is completed between the battery and the solenoids, or the battery and the timer, if the latter optional embodiment is employed. The micro switch 29 is operated in parallel with the oil pressure switch so that either switch can activate the solenoids or the timer.

When the vehicle is in motion, the solenoids are not activated. Thus, the first solenoid valve 23 is in an open position and the second solenoid valve 24 is in a closed position. Transmission fluid is thus able to flow from the automatic transmission pressure port 26 to the hydraulic cylinder 17 via, respectively, the fluid feed line 25, the first solenoid valve 24, the conduit 22 and the transmission fluid passageway 21. The closed second solenoid valve 24 prevents the transmission fluid from returning to the automatic transmission 13 via the fluid return line 27. The pressure from the transmission fluid actuates the hydraulic cylinder's plunger 18 which in turn engages the gear shift rod 11, thereby preventing the gear shift rod 11 from rotating and the vehicle from being shifted out of the gear in which it is operating. To shift the vehicle the operator must first depress the brake pedal 14. When the brake pedal 14 is depressed, the oil pressure switch 29 is closed and the solenoids are activated, closing the first solenoid valve 23 and opening the second solenoid valve 24. The transmission fluid will flow from the hydraulic cylinder 17 to the pressureless transmission return port 26 via respectively the transmission fluid passageway 21, the conduit 22, the second solenoid valve 24 and the fluid return line 27. The pressure is relieved in the hydraulic cylinder 17 and the hydraulic cylinder plunger 18, in withdrawing into the hydraulic cylinder, is disengaged from the gear shift rod 11. The rod 11 can be freely moved and the operator can shift the vehicle into the desired gear. When the break pedal 14 is released, the oil pressure switch is open, breaking the electrical circuits and deactivating the solenoids. The valves return to their normal positions.

The optional timer mechanism can be utilized to substantially insure that the vehicle has come to a full halt before the transmission is shifted, since the brake pedal 14 would have to remain depressed at least for the duration of the present timing cycle. The timer utilized in the present invention will be capable of automatically resetting to its start position once it is deactivated due to the release of the brake pedal.

It is understood that the gear shift rod 11 can be modified in a number of ways to thereby facilitate its being engaged by the locking means. For example, the gear shift rod 17 can be adapted to contain a hole along its length of a sufficient size to be able to accommodate a portion of the plunger means but not so large that after the plunger means engages the hole, the gear shift rod 11 can be moved to shift the vehicle's gears. Alternatively, a plate containing a hole can be attached to the gear shift rod 11, the hole of said plate being similarly adaptable to being engaged by the plunger means.

Although the preferred embodiment of the invention is described above, variations on the same are possible without departing from the spirit of the invention. For example, in the preferred embodiment, the automatic transmission fluid both enters and leaves the hydraulic cylinder through the transmission fluid passageway 21. In an alternative embodiment, there are separate passageways for fluid entering and leaving the hydraulic cylinder. Thus, in this embodiment, transmission fluid flows from the automatic transmission pressure port to the hydraulic cylinder via, respectively, the fluid feed line, the first solenoid valve and the first transmission fluid passageway. Transmission fluid flows from the hydraulic cylinder to the transmission return port via, respectively, a second transmission fluid passageway, the second solenoid valve and the fluid return line.

It is to be understood that the descriptive matter is in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for preventing shifting of a vehicle transmission while the vehicle is in motion, comprising:
   (a) vehicle gear shifting means;
   (b) fluid pressure operated vehicle braking means movable between a non-braking position and a braking position;
   (c) a hydraulically operated movable locking means adapted, when transmission fluid pressure is applied to said locking means, to immovably lock said gear shifting means when said braking means is in a non-braking position and, when the transmission fluid pressure is removed, release said gear shifting means when said braking means is in a braking position, said transmission fluid pressure being provided by the vehicle's transmission fluid, which is adapted to flow from the vehicle's automatic transmission to the locking means and back to the automatic transmission via a fluid circuit means; and
   (d) transmission fluid pressure regulator means which controls the flow of transmission fluid between the locking means and the vehicle's automatic transmission, said regulator means actuated by said braking means via an electrical circuit means.

2. The apparatus of claim 1 wherein the hydraulically operated locking means comprises a spring-loaded hydraulic cylinder which contains a plunger means whereby, when transmission fluid pressure is applied to the hydraulic cylinder, the hydraulic cylinder is actuated, the plunger means is extended out from the hydraulic cylinder and engages and prevents the movement of the gear shifting means and, when the transmission fluid pressure is removed, the plunger means is disengaged from the gear shifting means.

3. The apparatus of claim 2 wherein the transmision fluid pressure regulator means are a first electrically movable valve and a second electrically movable valve, wherein said first electrically movable valve controls the flow of the automatic transmission fluid into the hydraulic cylinder and the second electrically movable valve controls the flow of the automatic transmission fluid from the hydraulic cylinder.

4. The apparatus of claim 3 wherein, when said valves are not electrically activated, the first electrically movable valve is in an open position and the second electrically movable valve is in a closed position, thus permitting transmission fluid to flow into and actuate the hydraulic cylinder, and, when said valves are electrically activated, via said electrical circuit means the first valve is in a closed position and the second valve is in an open position, thus permitting the transmission fluid to flow from the hydraulic cylinder, and thus relieve the fluid pressure from the hydraulic cylinder.

5. The apparatus of claim 4 wherein a fluid pressure-sensitive switch means is positioned on the brake means whereby said switch means is in its open position when the brake means is in the non-braking position and said switch means is in its closed position when the brake means is in the braking position.

6. The apparatus of claim 5 wherein, when the switch means is in its closed position, the electrical circuit means is completed between a power source and the above said electrically movable valves, thus simultaneously closing the first valve and opening the second valve.

7. The apparatus of claim 6 wherein a timer switch mechanism is inserted in the electrical circuit means between the fluid pressure-sensitive switch means and the electrically movable valves.

* * * * *